United States Patent
Nader Tehrani et al.

(10) Patent No.: US 9,871,597 B2
(45) Date of Patent: Jan. 16, 2018

(54) APPARATUS AND METHOD FOR BLIND LOFO ESTIMATION IN COHERENT OPTICAL RECEIVER

(71) Applicants: Mohsen Nader Tehrani, Kanata (CA); Syed Faisal Ali Shah, Kanata (CA); Zhuhong Zhang, Ottawa (CA); Chuandong Li, Ottawa (CA)

(72) Inventors: Mohsen Nader Tehrani, Kanata (CA); Syed Faisal Ali Shah, Kanata (CA); Zhuhong Zhang, Ottawa (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/095,569

(22) Filed: Apr. 11, 2016

(65) Prior Publication Data
US 2017/0294971 A1   Oct. 12, 2017

(51) Int. Cl.
*H04B 10/61*   (2013.01)
*H04B 10/079*   (2013.01)
(Continued)

(52) U.S. Cl.
CPC ... *H04B 10/6164* (2013.01); *H04B 10/07955* (2013.01); *H04B 10/25* (2013.01);
(Continued)

(58) Field of Classification Search
None
See application file for complete search history.

(56) References Cited

U.S. PATENT DOCUMENTS

| | | |
|---|---|---|
| 7,606,498 B1 | 10/2009 | Wu et al. |
| 8,463,121 B2 | 6/2013 | Xu et al. |
| (Continued) | | |

FOREIGN PATENT DOCUMENTS

| | | |
|---|---|---|
| CN | 102725960 A | 10/2012 |
| EP | 2583424 B1 | 11/2014 |
| (Continued) | | |

OTHER PUBLICATIONS

Nakagawa, Tadao, et al., "Wide-range and fast-tracking frequency offset estimator for optical coherent receivers," 36th European Conference and Exhibition on Optical Communication, pp. 1-3, 2010.
(Continued)

*Primary Examiner* — Darren E Wolf
(74) *Attorney, Agent, or Firm* — Gowling WLG (Canada) LLP

(57) ABSTRACT

A method and apparatus is described for estimating a local oscillator frequency offset (LOFO) of a received optical signal in a coherent optical receiver. The method includes receiving a signal by the coherent optical receiver; digitally shifting a spectrum of the received signal according to one of a plurality of frequency shifts within a first range; equalizing each shifted signal based on a hybrid shifted filter response of a receiver driver, the hybrid shifted filter response is based on a combination of a linear shifted response and a circular shifted filter response of the receiver driver; calculating a difference of power between two sides of a spectrum of each equalized signal, the power for each side of the spectrum being calculated within a first area centered around a frequency corresponding to half of a baud rate of the received signal; determining a minimum power difference among the plurality of frequency shifts within the first range; and estimating the LOFO based on the minimum power difference.

14 Claims, 13 Drawing Sheets

(51) Int. Cl.
*H04B 10/25* (2013.01)
*H04B 10/60* (2013.01)
*H04J 14/02* (2006.01)
*H04B 10/2507* (2013.01)

(52) U.S. Cl.
CPC .......... *H04B 10/2507* (2013.01); *H04B 10/60* (2013.01); *H04J 14/0278* (2013.01)

(56) References Cited

U.S. PATENT DOCUMENTS 8,767,575 B2  7/2014  Zhang et al.
2016/0065304 A1  3/2016  Hauske et al.

FOREIGN PATENT DOCUMENTS

WO  WO 2012168926 A2 *  12/2012  ......... H03H 17/0266
WO  WO 2015117555 A1 *  8/2015  ......... H04B 10/6161

OTHER PUBLICATIONS

Leven, Andreas, et al., "Frequency Estimation in Intradyne Reception," IEEE Photonics Technology Letters, vol. 19, No. 6, pp. 366-368, 2007.
Li, Ming, et al., "Blind Carrier Frequency Offset Estimation Based on Eighth-Order Statistics for Coherent Optical QAM Systems," IEEE Photonics Technology Letters, vol. 23, No. 21, pp. 1612-1614, 2011.
International Search Report for PCT/CN20171079748 dated May 31, 2017.

* cited by examiner

Frequency (Hz)

APPARATUS AND METHOD FOR BLIND LOFO ESTIMATION IN COHERENT OPTICAL RECEIVER

TECHNICAL FIELD

The present disclosure relates to blind local oscillator frequency offset (LOFO) estimation, and more particularly, to an apparatus and method for blind LOFO estimation in a coherent optical receiver.

BACKGROUND

Coherent optical communication systems provide a means of communication over an optical fiber channel with improved power and spectral efficiency. In such systems, an optical signal is transmitted from a transmitter and is received by a receiver over an optical fiber communication channel. At the receiver, the received optical signal or its portion thereof is mixed with a local oscillator (LO) laser through a 90° optical hybrid, and the composite optical signal is converted to an electrical signal through a set of photodetectors. The respective analog electrical signal at the output of each photodetector is sampled and digitized by a high-speed analog-to-digital converter (ADC), and subsequently processed in a joint fashion by a digital signal processing (DSP) circuit to detect the transmitted information data.

Coherent optical communication systems enable higher spectral and power efficiency by modulating information data onto both of carrier phase and amplitude. To reduce cost, a coherent receiver generally employs intradyne coherent detection where the receiver relies on DSP based carrier recovery or carrier phase and frequency estimation by eliminating the need for an optical phase-locked loop (PLL). For such cases, a coherent receiver uses a free running LO laser that is tuned to a nominal frequency and not phase-locked to the transmitter laser, thus giving rise to a frequency offset between transmitter and LO lasers. This frequency offset is known as local oscillator frequency offset (LOFO) and can be as high as ±5 GHz for commercial tunable lasers. However, it is well-known in the art that various power efficient solutions for carrier recovery require a limited amount of LOFO for proper detection of the transmitted information data. For example, if the frequency offset between transmitter and LO lasers is larger than 800 MHz or so, some of the well-known carrier recovery algorithms fail to lock.

For coherent systems without an optical PLL at the receiver and commercial lasers without strict requirements on their frequency offsets, there may be a need for a coarse estimation of the frequency offset between transmitter and LO lasers. One known carrier frequency recovery method includes using a phase detector to estimate carrier phase and a phase rotator to apply a phase rotation to the received symbols. Phase errors are detected between the rotated symbols and the corresponding recovered symbols.

In certain deployments of coherent optical systems, it is not possible to change the structure and format of the transmit data frame to accomplish a header or unique word based estimation of the LOFO. In addition, the transmit frame header or transmit unique word may not be known to the receiver due to proprietary nature of transmit data frame format among different manufacturers of the optical network equipment. Furthermore, the use of frame header or inclusion of unique word in the transmit data frame for frequency offset estimation may incur some penalty on spectrum efficiency of the system and may not be always affordable. To circumvent these issues, a blind method of LOFO estimation is desired that is independent of the transmit frame header and/or unique word in the transmit frame.

As such, a method and apparatus that addresses at least some of these problems is desired.

SUMMARY

The following presents a summary of some aspects or embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments of the disclosure in a simplified form as a prelude to the more detailed description that is presented later.

In one embodiment of the present disclosure there is provided a method for estimating a local oscillator frequency offset (LOFO) of a coherent optical receiver. The method comprises receiving a signal by the coherent optical receiver; digitally shifting a spectrum of the received signal according to one of a plurality of frequency shifts within a first range; equalizing the shifted spectrum according to each of the plurality of frequency shifts based on a hybrid shifted filter response of a receiver driver, the hybrid shifted filter response is based on a combination of a linear shifted response and a circular shifted filter response of the receiver driver; calculating a difference of power between two sides of each equalized spectrum, the power for each side of the spectrum being calculated within a first area centered around a frequency corresponding to half of a baud rate of the received signal; determining a minimum power difference among the plurality of frequency shifts within the first range; and estimating the LOFO based on the minimum power difference.

In another embodiment of the present disclosure there is provided a digital signal processing apparatus for estimating a local oscillator frequency offset (LOFO) of a coherent optical receiver. The digital signal processing apparatus comprises a digital frequency shifter for digitally shifting a spectrum of a signal received by the coherent optical receiver according to one of a plurality of frequency shifts within a first range; an equalizer module for equalizing the spectrum shifted according to each of the plurality of frequency shifts based on a hybrid shifted filter response of a receiver driver, the hybrid shifted filter response is based on a combination of a linear shifted response and a circular shifted filter response of the receiver driver; and a LOFO estimation module for estimating the LOFO, wherein the LOFO estimation module is configured to calculate a difference of power between two sides of each equalized spectrum, determine a minimum power difference among the plurality of frequency shifts within the first range, and estimate the LOFO based on the minimum power difference, the power for each side of the spectrum being calculated within a first area centered around a frequency corresponding to half of a baud rate of the signal received by the coherent optical receiver.

In yet another embodiment of the present disclosure there is provided a method for estimating a local oscillator frequency offset (LOFO) of a coherent optical receiver. The method comprises receiving a signal by the coherent optical receiver; digitally shifting a spectrum of the received signal according to one of a plurality of frequency shifts within a first range; equalizing the spectrum shifted according to each of the plurality of frequency shifts based on a shifted filter response of a receiver driver; calculating a difference of power between two sides of each equalized spectrum, the power for each side of the spectrum being calculated within a first area centered around a frequency corresponding to half of a baud rate of the received signal; determining a minimum power difference among the plurality of frequency shifts within the first range; estimating the LOFO based on the minimum power difference; and determining if the estimated LOFO is within a second range. If the estimated LOFO is within the second range, the method further comprises calculating a difference of slopes between two sides of the spectrum of the equalized signal, the slope for each side of the spectrum being calculated within a second area located closer to a center of the spectrum than the first area; determining a minimum slope difference among the plurality of frequency shifts within a third range, the third range being determined based on the first range and the estimated local frequency offset; and estimating a refined LOFO based on the minimum slope difference.

BRIEF DESCRIPTION OF THE DRAWINGS

These and other features of the disclosure will become more apparent from the description in which reference is made to the following appended drawings.

DETAILED DESCRIPTION

Figure 1:
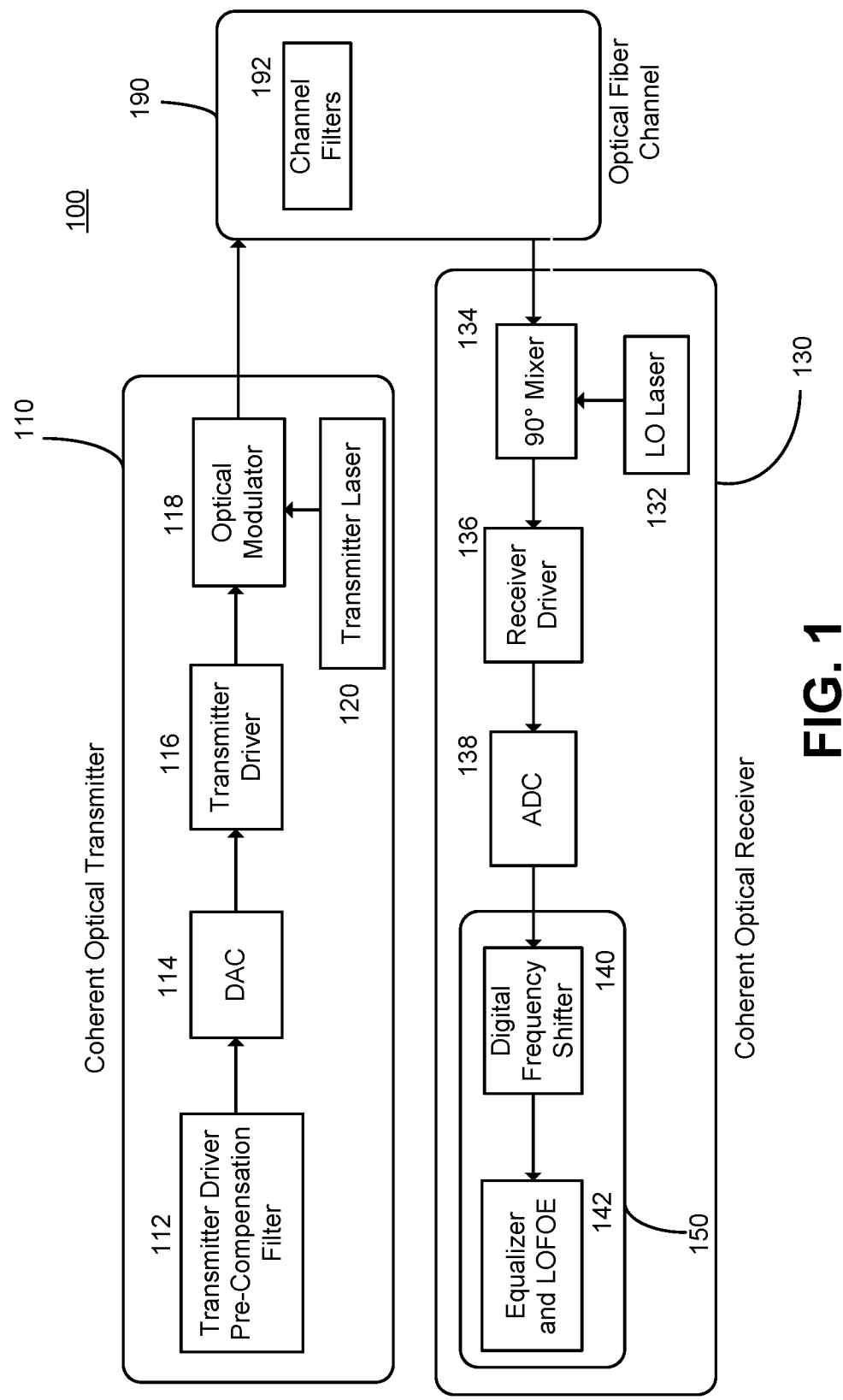
FIG. 1 is a schematic diagram of a coherent optical communication system, to which the described apparatus and method is applicable.

The following detailed description contains, for the purposes of explanation, various illustrative embodiments, implementations, examples and specific details in order to provide a thorough understanding of the invention. It is apparent, however, that the disclosed embodiments may be practiced, in some instances, without these specific details or with an equivalent arrangement. The description should in no way be limited to the illustrative implementations, drawings, and techniques illustrated below, including the designs and implementations illustrated and described herein, but may be modified within the scope of the appended claims along with their full scope of equivalents.

Disclosed herein are methods and apparatuses for blind local oscillator frequency offset (LOFO) estimation in a coherent optical transceiver or receiver. The blind LOFO estimation according to the disclosed methods and apparatuses use a spectrum-based power measurement of a received signal in the digital domain. The disclosed methods and apparatus only require knowledge of a baud rate of the signal. In some embodiments, the methods and apparatuses compensate a receiver driver filtering effect based on a hybrid shifted filter response of the receiver driver. In some embodiments, the methods and apparatuses are refined to mitigate a channel filtering effect. As a result, the described methods and apparatuses can be less sensitive to the receiver filtering effect and/or the channel filtering effect and can have less complexity compared to conventional methods.

For the purpose of this disclosure, the expression "digital signal processing apparatus" is used to encompass all digital signal processors, digital signal processing devices, circuits, implementations, units, modules, means, whether implemented in hardware, software and/or firmware. A digital signal processing apparatus may comprise an application specific integrated circuit (ASIC), a field-programmable gate array (FPGA), or can be an off-the-shelf digital signal processing (DSP) chip. In accordance with some embodiments, the digital processing apparatus is an optical DSP.

To increase spectral efficiency, coherent optical communication systems use advanced modulation schemes, e.g., quadrature amplitude modulation (QAM) and/or phase shift keying (PSK), to modulate data onto carrier phase and amplitude. However, coherent detection of QAM or PSK signals may be more challenging than detection of amplitude-only modulated signals (e.g., direct detection of pulse amplitude modulated signals) because it requires carrier phase and frequency estimation for demodulation of the received signal. For instance, a coherent optical receiver without an optical phase-locked loop (PLL) may use a free running local oscillator (LO) laser, tuned to a nominal frequency and not phase-locked to the transmitter laser, to mix with the received optical signal through a 90° optical hybrid. For such receivers, the LO laser may not be frequency locked to the transmitter laser or the carrier of the received signal. This may give rise to a frequency offset between the transmit and LO lasers, known as the LOFO. LOFO can be caused by a number of factors including various practical limitations, e.g., aging of the transmit laser and/or LO laser.

The LOFO can be corrected in part by a carrier recovery module of a coherent optical receiver. For example, the carrier recovery module can use a digital PLL for this purpose. However, the implementation of the digital PLL may incur a loop delay that may only tolerate up to a certain amount of LOFO, for example in the range of 600 MHz to 800 MHz. Therefore, a coarse estimation of the LOFO is desired for proper operation of the digital PLL based carrier recovery.

There is a general desire for a coherent optical receiver or transceiver chip to be able to process received signals with minimal knowledge of the configuration of the transmitter. Especially for multi-vendor interoperability, a coherent optical receiver may be required to work without any specific knowledge about the physical layer transmit frame structure and/or transmit unique word that can be used for LOFO estimation (LOFOE). In addition to this, the deployment of legacy optical communication systems may not be able to accommodate or amend the structure of the transmit data frame to enable a header or unique word based LOFOE. Furthermore, the inclusion of transmit unique word for the purpose of LOFOE may reduce the spectral efficiency of the optical communication system. Thus, a blind method of LOFOE is needed that is independent of the transmit frame header and/or unique word in the transmit frame.

The disclosure provides methods and apparatuses for blind LOFOE that can be applicable to coherent optical receivers and transceivers where no information about the transmitted signal is available except for the baud rate of the transmitted signal.

There are generally two types of algorithms for blind LOFOE. The first type of blind LOFOE methods use modulation or signal constellation information for LOFOE and the second type of blind LOFOE methods rely on a spectrum-based power measurement of the received signal around its center frequency.

The first type of blind LOFOE may work well when chromatic dispersion (CD), polarization mode dispersion (PMD), state of polarization (SOP) rotation and/or polarization dependent loss (PDL) are compensated. However, in long-haul optical fiber communication systems, a coherent optical receiver or transceiver may require a coarse estimation and compensation of LOFO so that subsequent modules can properly compensate some other impairments from the fiber optical channel, including PMD, SOP rotation and/or PDL.

The second type of blind LOFOE does not need any information about the received optical signal other than the baud rate and has less complexity compared to the first type. However, in prior systems, blind LOFOE can involve a power measurement of the entirety or a large portion of the signal spectrum. As well, because filtering can cause asymmetry in the signal spectrum, prior systems may be vulnerable to the filtering effect caused by various filters in the optical channel and at the receiver, and as a result the performance and accuracy of these prior systems may not be satisfactory.

A schematic diagram of a coherent optical communication system 100 is shown in FIG. 1, to which the described method and apparatus is applicable. The system 100 comprises a coherent optical transmitter 110, an optical channel 160, and a coherent optical receiver 130 arranged as illustrated in FIG. 1. Each of the coherent optical transmitter 110 and receiver 130 can be implemented as an individual chip, or as a part of a transceiver chip.

A transmitted optical signal from the transmitter 110 may go through a transmitter driver pre-compensation filter 112, a digital-to-analog convertor (DAC) 114, a transmitter driver 116, and an optical modulator 118. A transmitter laser 120 generates an optical signal to be modulated by the optical modulator 118 for transmission. The transmitter laser 120 determines the carrier frequency of the transmitted signal. The transmitted signal could have any type of modulation, e.g., PSK or QAM, and the blind LOFOE methods described herein are independent of the modulation format of the transmitted signal.

The channel 190 transports the modulated signal from the transmitter 110 to the receiver 130, and may comprise one or more channel filters 192 such as one or more cascaded wavelength-selective switches (WSSs). The components of the channel 190 may also introduce impairments, including for example CD, nonlinear phase noise, PMD, PDL and/or polarization dependent gain, SOP rotation, white Gaussian noise, or combinations thereof.

The receiver 130 is configured to receive the optical signal. The receiver 130 includes a LO laser 132 which generates an optical signal having a carrier frequency that is about the same as that of the transmitter laser 120. As described above, the LO laser 132 can include an unknown amount of LOFO, compared to the transmitter laser 120. The receiver 130 further includes a 90° mixer 134, a receiver driver 136 (e.g., a transimpedance amplifier (TIA)), an analog-to-digital converter (ADC) 138, and a DSP unit 150 coupled to the ADC 138. The 90° optical mixer 134 may comprise a 90° optical hybrid circuit and a plurality of photodetectors. The 90° optical mixer 134 can be configured to mix the received optical signal with the signal generated by the LO 132 to produce orthogonal components of the received signal. The mixed signals can be subsequently converted to electrical signals through a set of photodetectors. The orthogonal components of the electrical signal can be amplified by the receiver driver 136, so that the ADC 138 can convert them from analog to the digital domain. The digital samples from the ADC 138 can be forwarded to the DSP unit 150 for further processing.

According to various embodiments of the disclosure, in the receiver 130, the DSP unit 150 can include a digital frequency shifter 140 and an equalizer and LOFOE module 142.

The digital frequency shifter 140 includes a numerically controlled oscillator (NCO) to shift a spectrum of the received signal according to one of a plurality of frequency bins (referred to as frequency shifts) within a first range. The first range can be pre-determined based on the maximum likely LOFO according to the specifications of the receiver LO laser 132. For example, in one particular implementation, the digital frequency shifter 140 can shift the spectrum of the received signal to different LOFO frequency bins between −5 GHz to +5 GHz, or between −4 GHz to +4 GHz.

Figure 2:
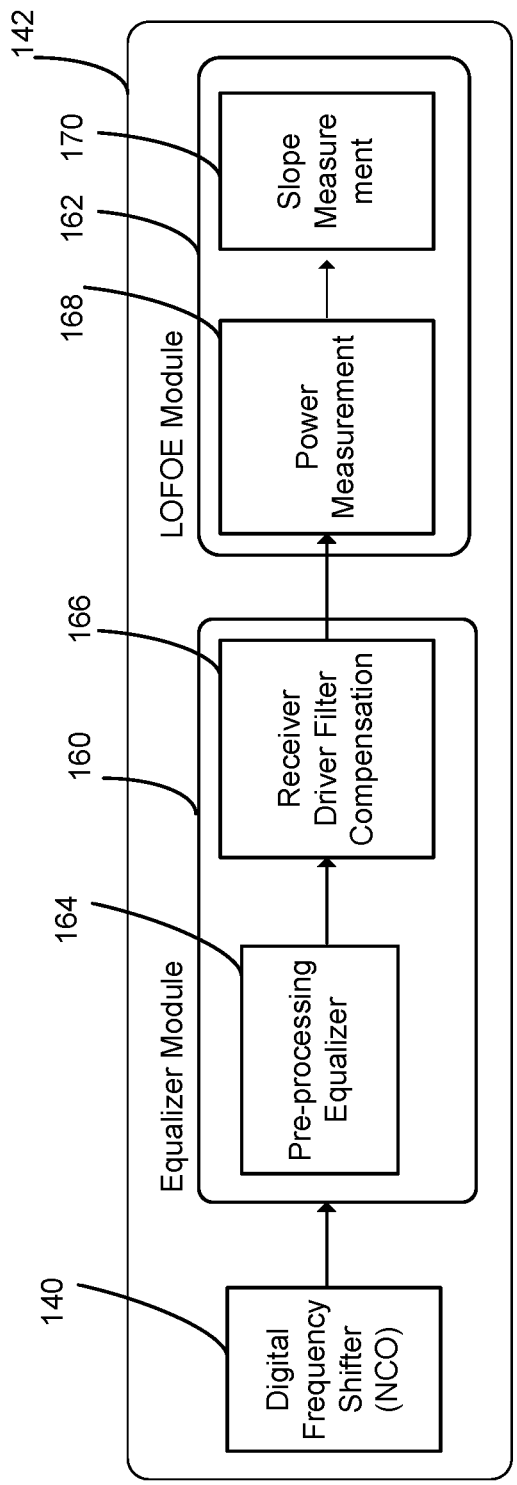
FIG. 2 is a schematic diagram of an embodiment of an equalizer and LOFO estimation module.

A schematic diagram of an embodiment of the equalizer and LOFOE module 142 is shown in FIG. 2.

The equalizer and LOFOE module 142 includes an equalizer module 160 for equalizing the received signal, and a LOFOE module 162 for estimating a LOFO of the receiver with respect to the carrier frequency of the transmitted signal.

The equalizer module 160 can include a pre-processing equalizer module 164 for compensating the CD and/or pulse shaping effect, and a compensation module 166 for compensating the low pass filter (LPF) effect of the receiver driver 136. As will be explained in more detail below and according to some embodiments of the disclosure, the compensation module 166 compensates the signal based on a hybrid shifted filter response of the receiver diver 136.

The LOFOE module 162 is configured to estimate the LOFO. The spectrum of the received signal is shifted by the digital frequency shifter 140, according to the plurality of frequency shifts within the first range. Digital samples of each shifted signal are used to compute the power of each shifted signal in the frequency domain. Only two specified bands of frequencies are used to calculate the power of each shifted signal. In one embodiment, the two frequency bands are located on opposite sides of the spectrum, and are symmetric with respect to the center frequency of the shifted signal. A power difference between the two frequency bands is calculated and the value of the frequency shift in the first range which gives the minimum power difference between the upper sideband and the lower sideband of the signal spectrum provides an estimated LOFO.

In particular, the LOFOE module 162 can include a power measurement module 168 configured to calculate a power difference between two sides of a spectrum of each equalized signal from the equalizer module 160. The power measurement module 168 is further configured to determine a minimum power difference among all frequency shifts within the first range. The signal power in each side of the spectrum is calculated over a specified band of frequencies (referred to as a first area), and the location of the first area is determined by a baud rate of the received signal. More specifically, the first area is centered around a frequency corresponding to half of a baud rate of the received signal.

Figure 3:
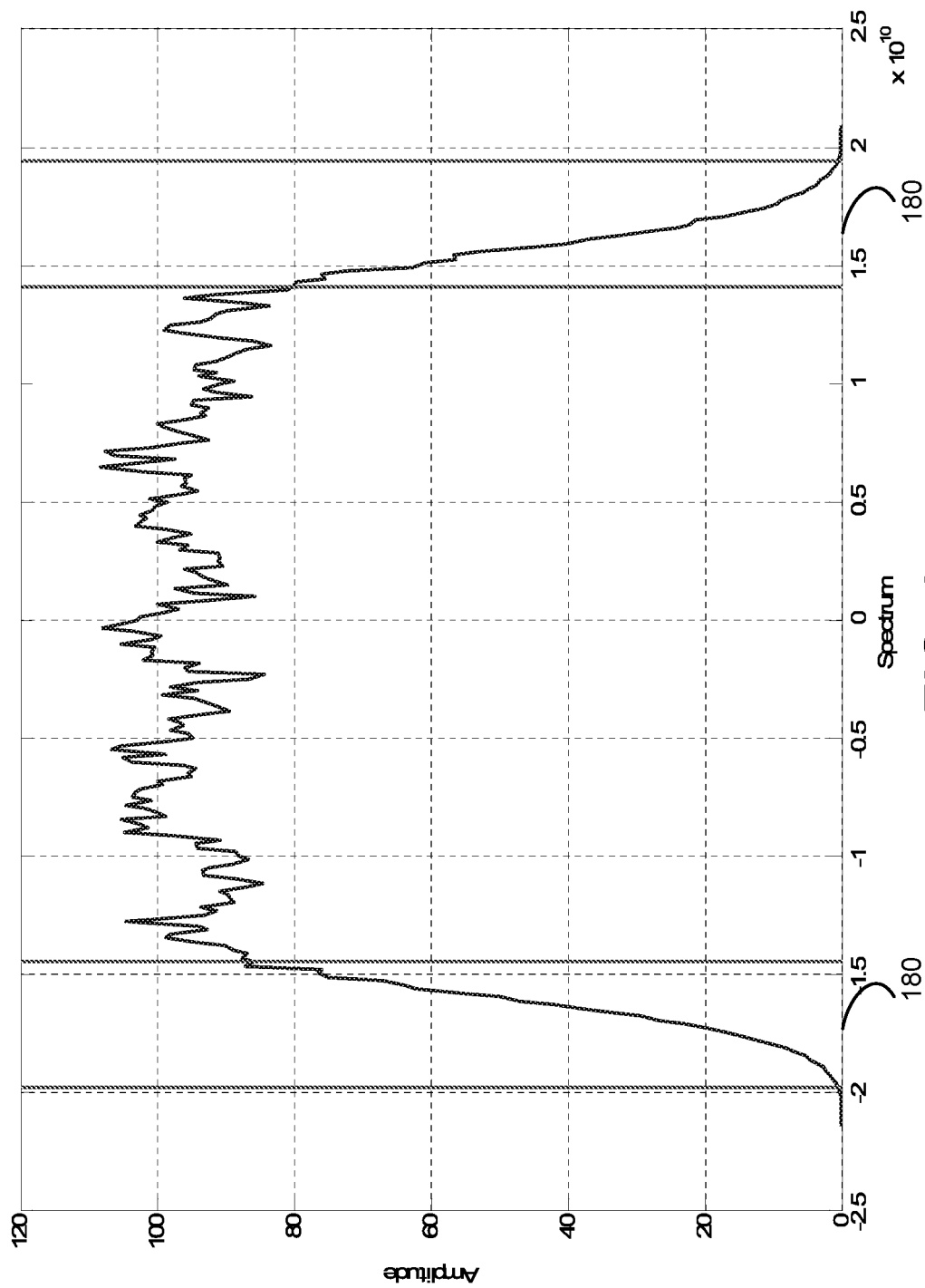
FIG. 3 depicts an example of an area in signal spectrum used for energy measurement.

FIG. 3 depicts an example of the first area 180 used for power measurement. For illustration purposes, the actual LOFO is zero in this example. The first area 180 represents a band of frequencies in the upper or lower sideband of the received signal spectrum. In this particular embodiment, the first area 180 includes N frequency bins around the frequency bin corresponding to fBaud/2, where fBaud is the baud rate of the received signal. As shown in FIG. 3, only a limited area of the signal spectrum is used for power measurement (N is much lower than the total number of bins used to estimate the spectrum of the received signal in FIG. 3), and as a result the complexity of the calculation can be reduced compared to a power measurement involving the entire signal spectrum or a large portion thereof. The power measurement can be based on a summation of the power of individual frequency bins within the first area or based on any other suitable power measurement methods.

Referring back to FIG. 2, the receiver driver filter compensation module 166 is configured to compensate the LPF effect caused by the receiver driver filter 136. However, as shown in FIG. 2, the receiver driver filter 136 is applied to the received signal which has been shifted due to the existence of frequency offset in the local oscillator. On the other hand, compensation of the LPF effect is performed on the received signal which has not gone through frequency correction by the digital frequency shifter 140. Therefore, if the compensation module 166 merely applies an inverse of the response of the receiver driver filter 136, the LPF effect will not be sufficiently compensated.

To compensate the effect of the receiver driver 136 in the presence of a LOFO, the compensation module 166 is configured to shift the response hRF of the receiver driver filter 136, typically a LPF, and equalize the shifted signal according to the shifted response of hRF. In this way, the response hRF of the receiver driver 136 is shifted to correspond to the shifted optical signal. The shifted signal can be equalized based on a linear shifted filter response, a circular shifted filter response, or a hybrid shifted filter response. A hybrid shifted filter response is a combination of the linear shifted filter response and the circular shifted filter response. According to one particular embodiment, the hybrid shifted filter response $hRF_{hybrid}$ satisfies the relationship of:

$$hRF_{hybrid}=0.5*hRF_{linear}+0.5*hRF_{circular} \quad (1)$$

where $hRF_{linear}$ is the linear shifted filter response and $hRF_{circular}$ is the circular shifted filter response. It should be understood that other combinations of coefficients of the linear shifted filter response and the circular shifted filter response can be used.

Figure 4A:
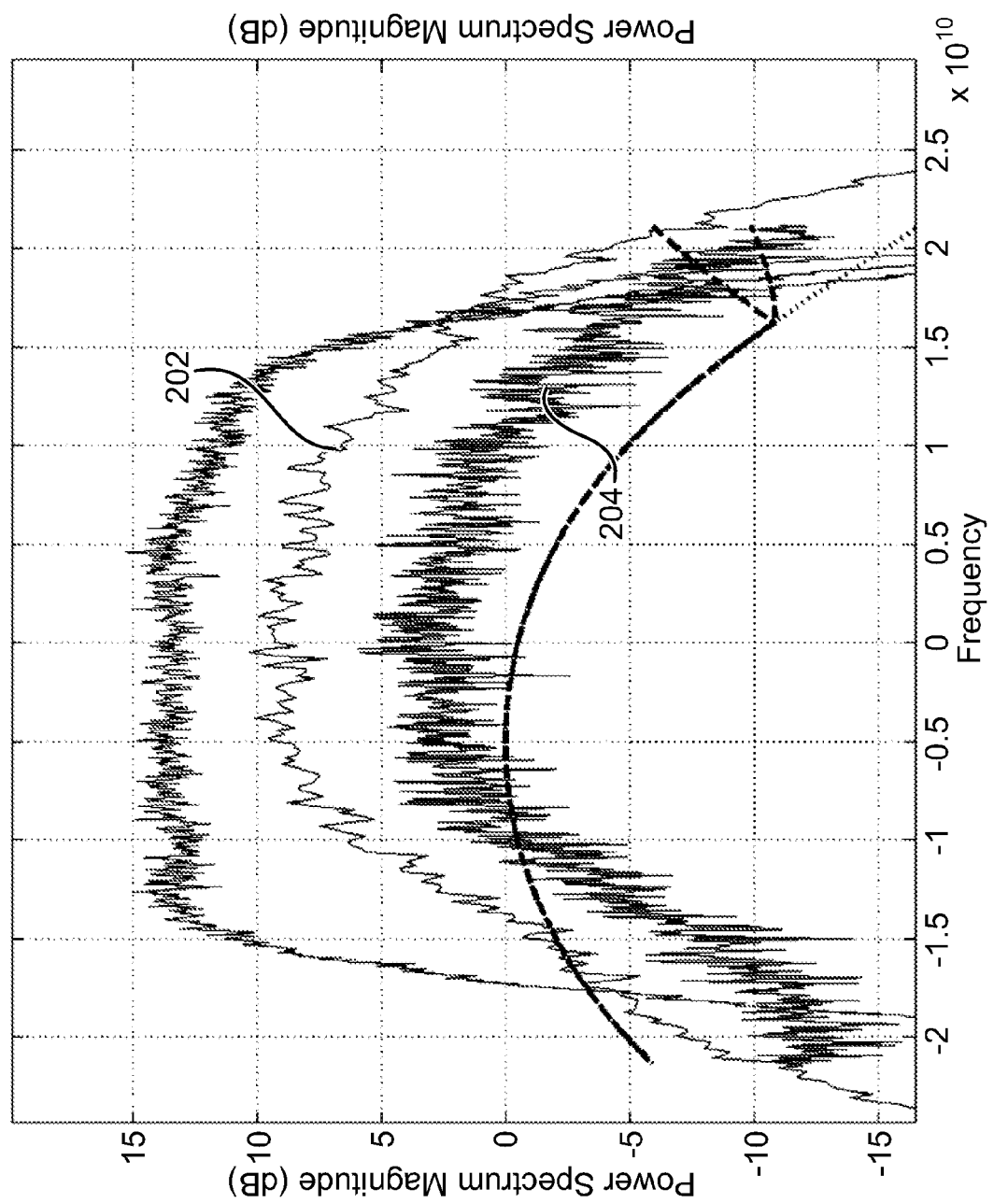
FIG. 4A and FIG. 4B depict examples of power spectrums of various shifted filter responses and of compensated signals using the shifted filter responses.
Figure 4B:
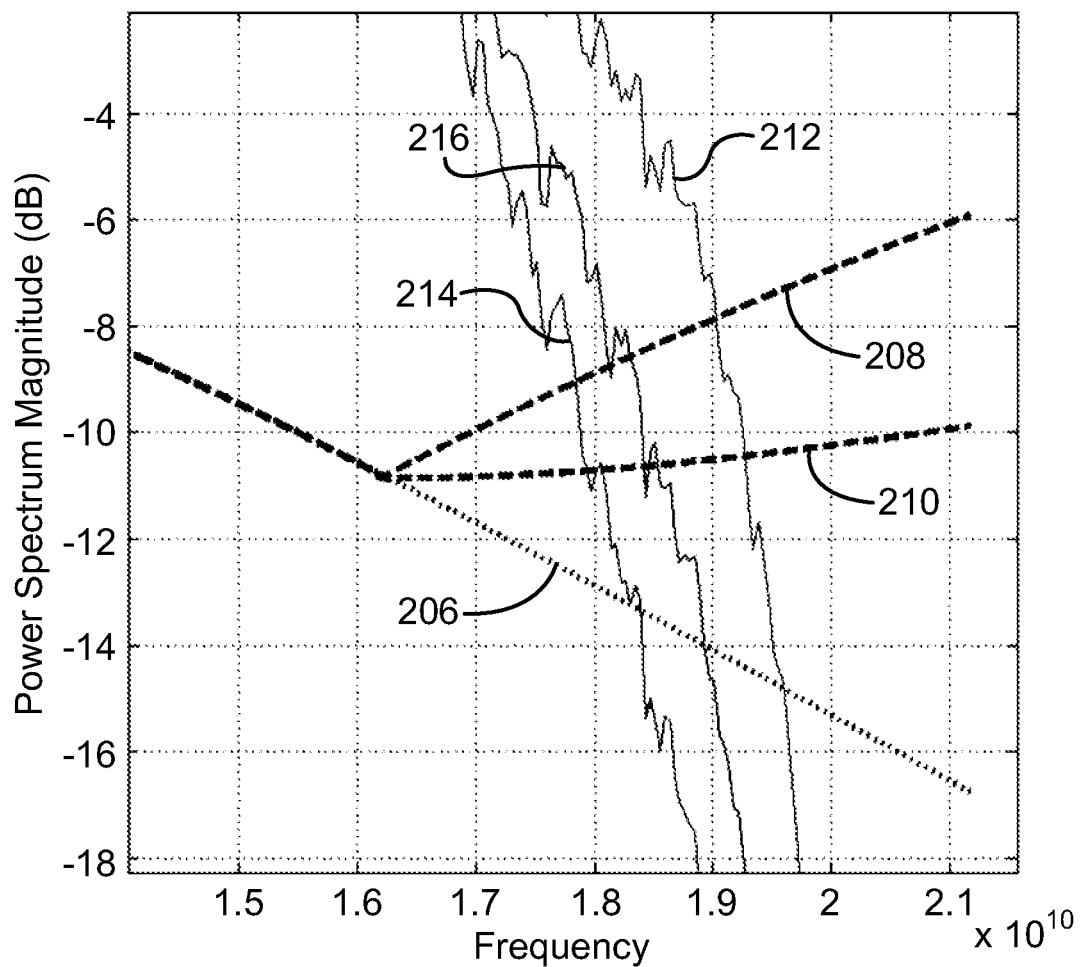

FIG. 4A and FIG. 4B depict examples of the power spectra of various shifted filter responses and of compensated signals using the shifted filter responses. Right hand side parts of the spectrum are enlarged in FIG. 4B to illustrate the graphs in further detail.

In this particular example, FIG. 4A depicts the power spectrum 202 of a received signal after the receiver driver 136 and before the ADC 138. In this example, the receiver 130 suffers from an actual LOFO of 5 GHz that causes asymmetry in the power spectrum 202 of the received signal. FIG. 4 depicts the power spectrum of the converted signal 204 after the ADC 138. As shown, the ADC 138 causes aliasing to the signal 204 at the left side of the spectrum.

FIG. 4B also depicts the power spectrum of a linear shifted filter response 206, of a circular shifted filter response 208, and of a hybrid shifted filter response 210 obtained according to equation (1).

FIG. 4B further depicts the power spectrum of a compensated signal 212 based on the linear shifted filter response 206, of a compensated signal 214 based on the circular shifted filter response 208, and of a compensated signal 216 based on the hybrid shifted filter response 210.

As shown in FIG. 4, the compensated signals 212, 214, 216 present discrepancies in the spectrum at the higher frequency areas.

Figure 5A:
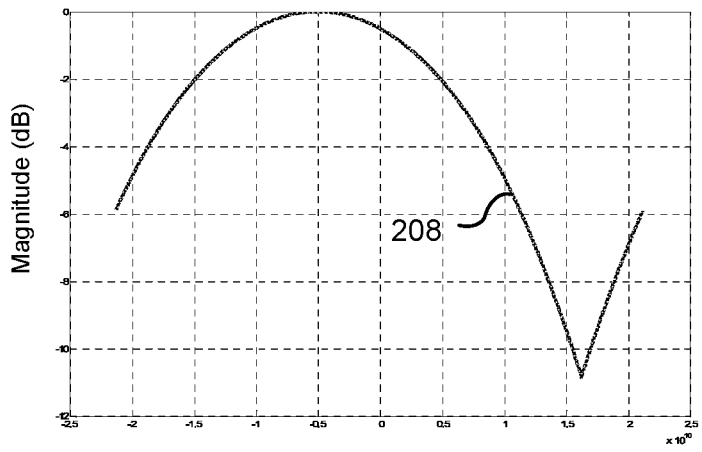
FIG. 5A depicts an example of the power spectrum of a circular shifted filter response.
Figure 5B:
FIG. 5B depicts an example of the power spectrum of a linear shifted filter response.
Figure 5C:
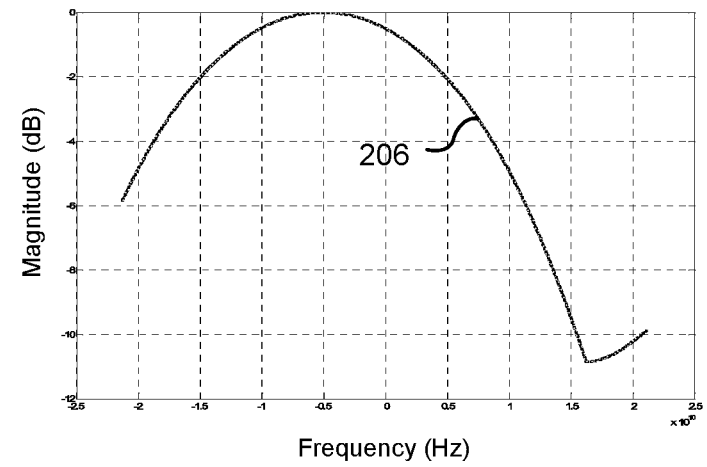
FIG. 5C depicts an example of the power spectrum of a hybrid shifted filter response.

FIG. 5 depicts in separate graphs the various shifted filter responses. In particular, FIG. 5A shows an example of the power spectrum of the circular shifted filter response; FIG. 5B depicts an example of the power spectrum of the linear shifted filter response; and FIG. 5C depicts an example of the power spectrum of the hybrid shifted filter response.

The filter response with hybrid shift is based on a combination of the linear shifted filter response and the circular shifted filter response, and achieves improved compensation of driver filter response. The hybrid shifted filter response can compensate for the aliasing effect caused by the ADC 138 and an effective circular shift caused by the digital frequency shifter 140.

Figure 6:
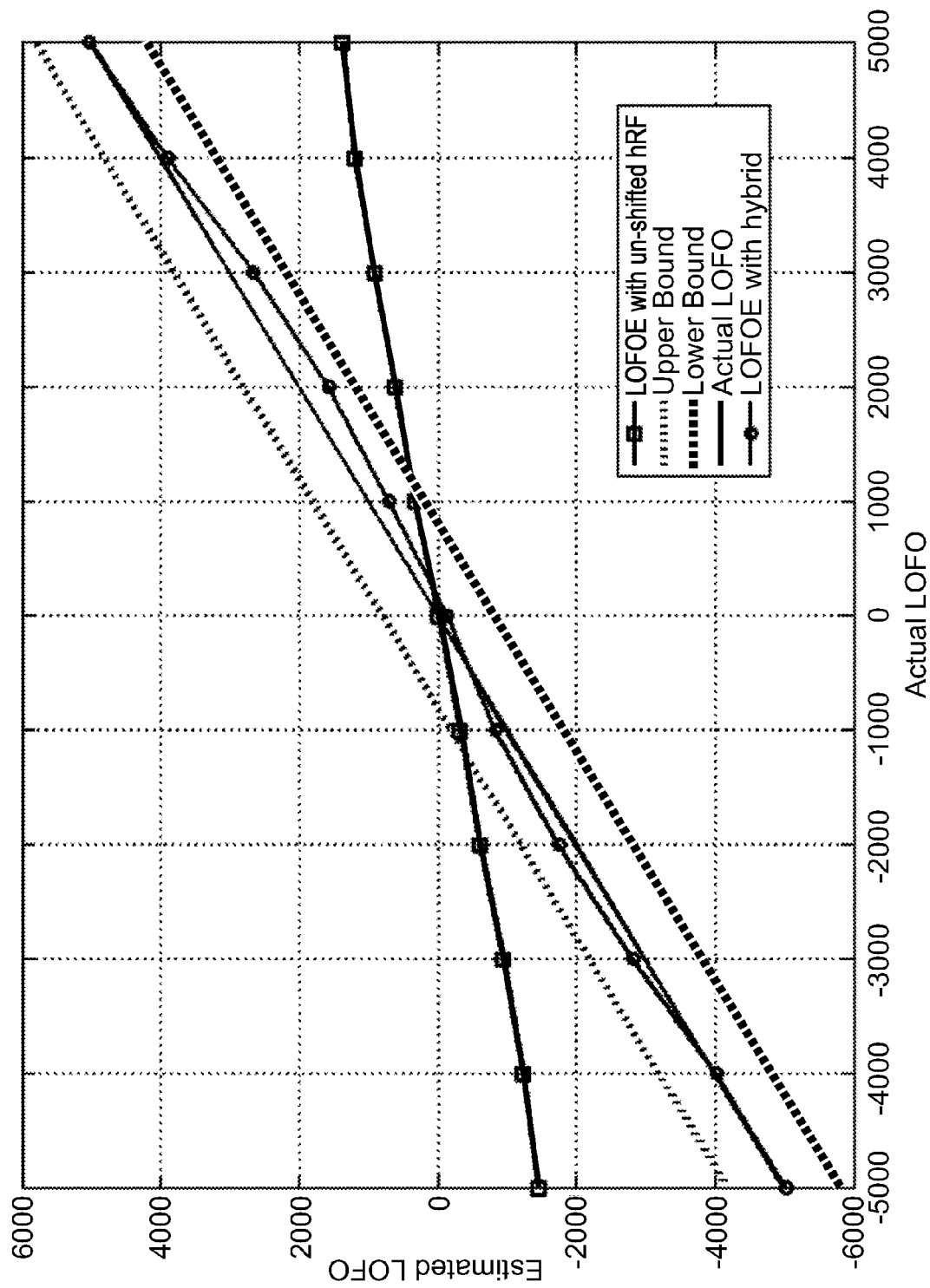
FIG. 6 depicts a comparison between an estimated LOFO based on an un-shifted filter response and an estimated LOFO based on a hybrid shifted filter response.

FIG. 6 depicts a comparison between an estimated LOFO based on an un-shifted filter response and an estimated LOFO based on a hybrid shifted filter response.

In this particular example, the actual LOFO is assumed to be between −5 GHz and 5 GHz. As shown in FIG. 6, there exists a large gap between the estimated LOFOs obtained based on an un-shifted filter response and the actual LOFOs. In comparison, the estimated LOFOs obtained based on a hybrid shifted filter response are closer to the actual LOFOs.

Referring back to FIG. 2, the optical channel often comprises one or more channel filters 192 such as one or more cascaded WSSs. When the received signal is influenced by a LOFO, channel filtering can cause power discrepancy on the two sides of the spectrum, thereby causing a decrease of the accuracy of the estimated LOFO when the number of channel filters 192 increases.

Figure 7:
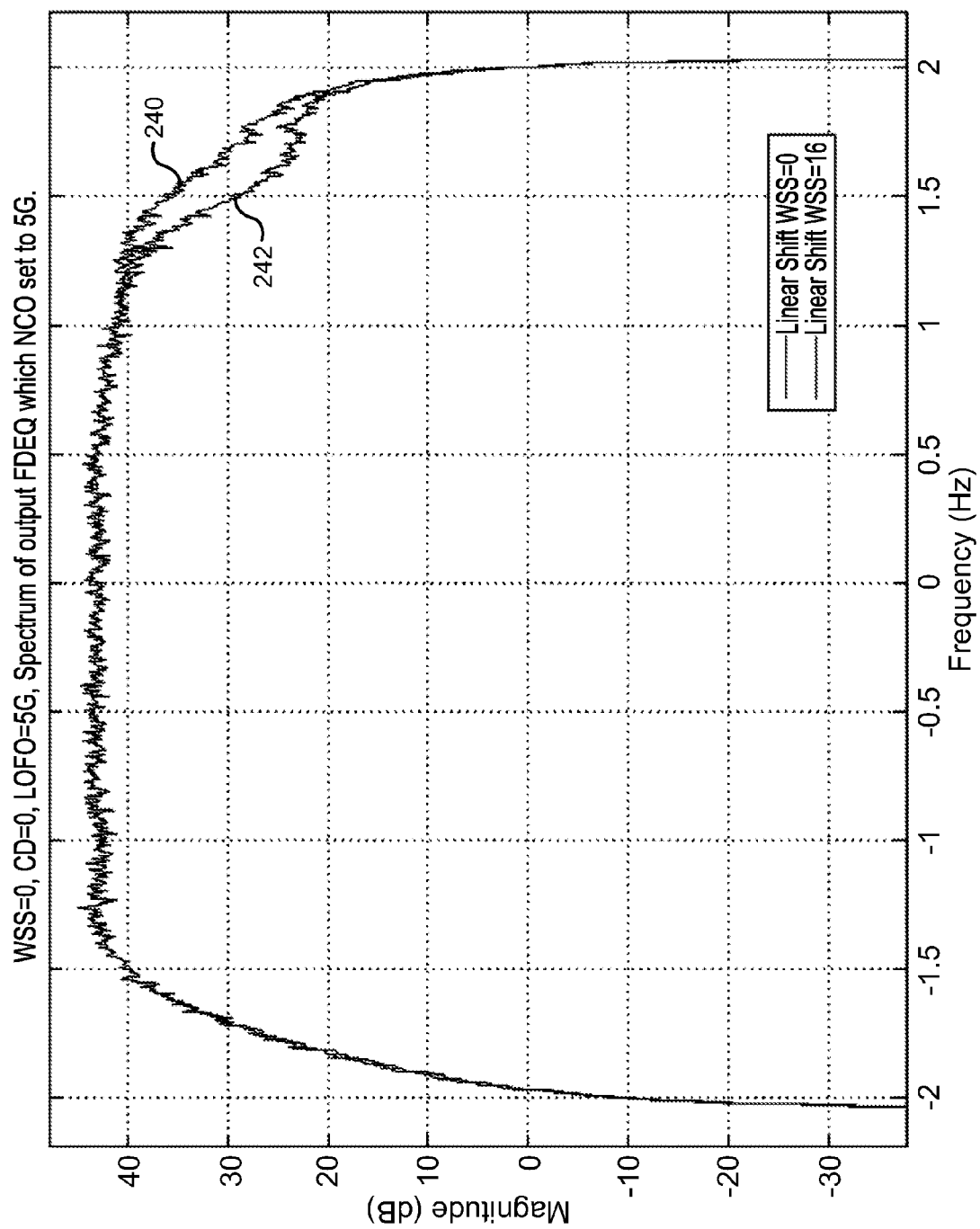
FIG. 7 depicts an example of the channel filtering effect on a signal spectrum.

FIG. 7 depicts an effect of channel filtering on a signal spectrum. In this particular example, the actual LOFO is assumed to be 5 GHz; the digital frequency shifter 140 is assumed to shift the received optical signal by the actual LOFO of 5 GHz and the CD effect is assumed to be compensated by the equalizing module 160. The received signal is equalized based on a linear shifted filter response. FIG. 7 shows a comparison between the spectrum of the signal 240 when no WSS is included, and the spectrum of the signal 242 when 16 WSSs are included. As shown, the signal 242 is significantly attenuated on one side of the spectrum with the increased use of channel filters 192.

In a typical coherent optical receiver, the exact number of the optical filters in the link or channel may not be available to the receiver due to the dynamic nature of the link and its corresponding filters. Because the number of channel filters 192 is unknown to the receiver 130, according to some embodiments of the disclosure the receiver 130 assumes the existence of a channel filtering effect when the estimated value of LOFO is within a certain range and estimates a refined value of LOFO to compensate the channel filtering effect. The certain range, namely a second range, is a subset of the first range and refers generally to a range of estimated values of LOFO where the received optical signal is most likely affected by the channel filtering. The second range is typically located at the higher frequencies of the first range. According to one particular embodiment, the second range is [2 GHz 5 GHz] and [−5 GHz −2 GHz].

According to some embodiments of the disclosure, the LOFOE module 162 is configured to determine if the estimated LOFO is within the second range. If the estimated LOFO is outside the second range, the estimated local frequency offset is output for the LOFO module 134 to adjust the LO laser 132 based on the estimated LOFO.

If the estimated LOFO is within the second range, the LOFOE module 162 can further include a slope measurement module 170 for estimating a refined LOFO based on a slope difference of the signal spectrum.

In particular, if the estimated LOFO is within the second range, the slope measurement module 170 is configured to calculate a difference of slopes between two sides of the signal spectrum. The slope measurement module 170 is further configured to determine a minimum slope difference among the plurality of frequency shifts within a third range and estimate a refined LOFO based on the minimum slope difference. The minimum slope difference gives the refined LOFO.

The third range can be determined based on the first range and the estimated local frequency offset. In one particular embodiment, the third range starts from the estimated LOFO and ends at an outer bound of the first range.

The slope for each side of the spectrum is calculated within a second area located closer to the center of the spectrum than the first area. The second area can be obtained by moving the first area used for power measurement described above towards the center of the spectrum, in order to be less affected from the channel filters 192. The slope measurement can be based on an average or median value of sample points inside the third area or based on any other suitable slope measurement methods.

Figure 8:
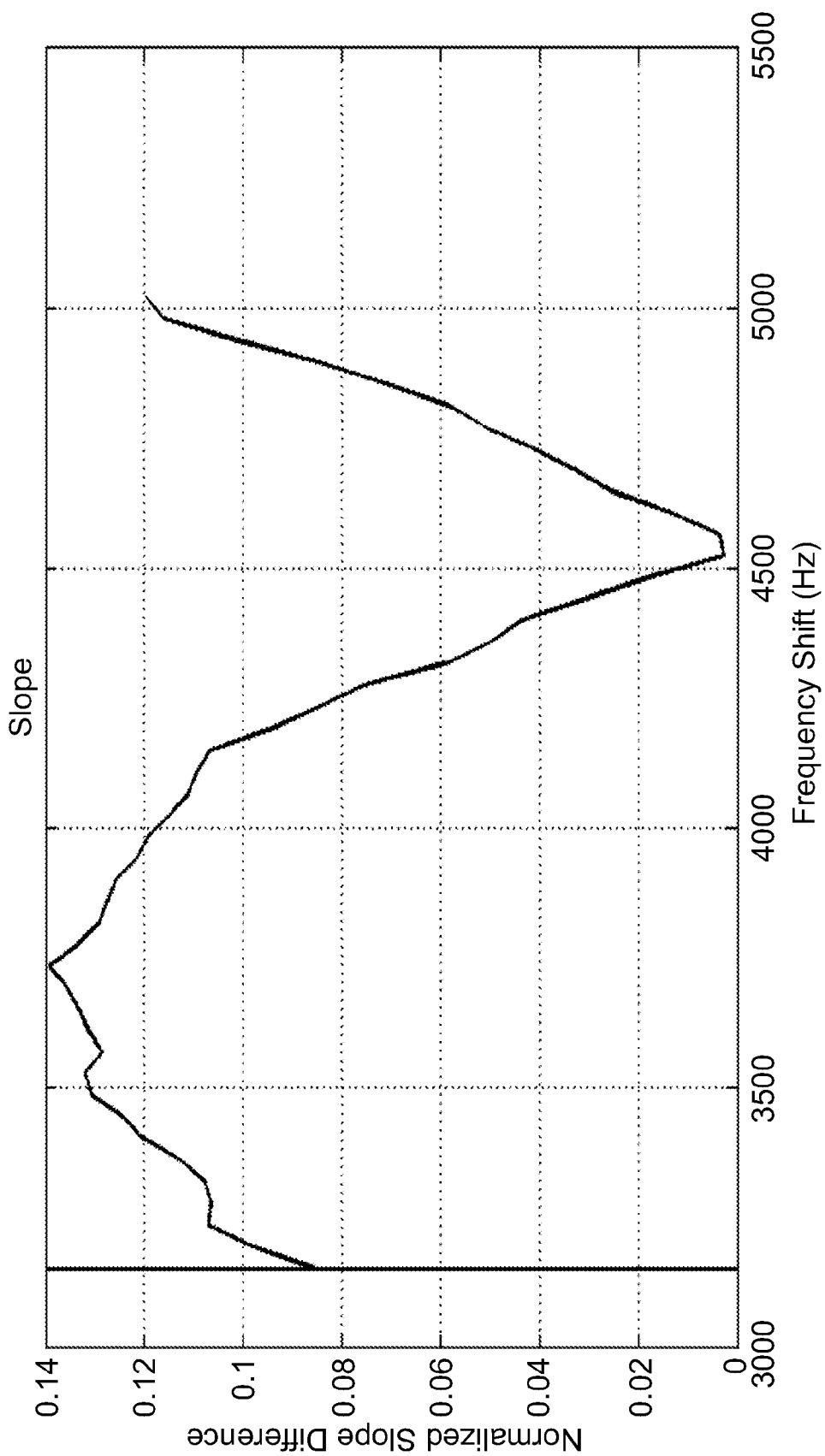
FIG. 8 depicts an example of a difference in slopes between two sides of the signal power spectrum within a third range when an actual LOFO is 5 GHz.

FIG. 8 depicts an example of the slope difference 250, when an actual LOFO is 5 GHz. If the estimated LOFO is equal to or greater than 2 GHz, or is equal to or less than −2 GHz, a search for the minimum slope difference can begin from the estimated LOFO. For example in the particular example shown in FIG. 8, the actual LOFO is 5 GHz. Without applying the refinement, the estimated LOFO may be 3.2 GHz and the error in LOFO estimation is 1.8 GHz off from the actual value. By applying the slope measurement based refinement, the minimum slope difference is obtained at 4.6 GHz which is only 400 MHz off from the actual value.

Figure 9:
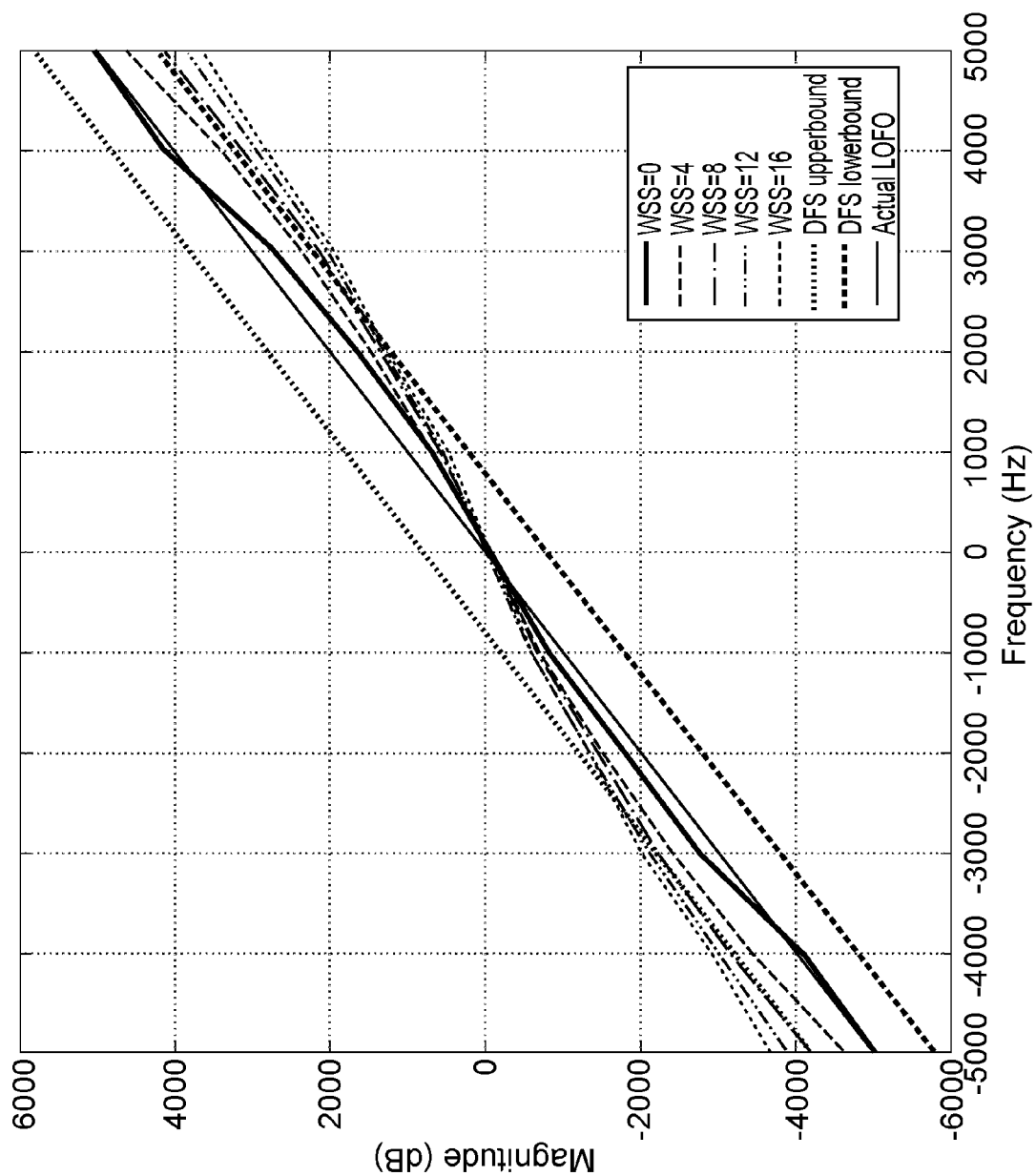
FIG. 9 depicts estimated LOFOs for various numbers of channel filters, according to one embodiment.
Figure 10:
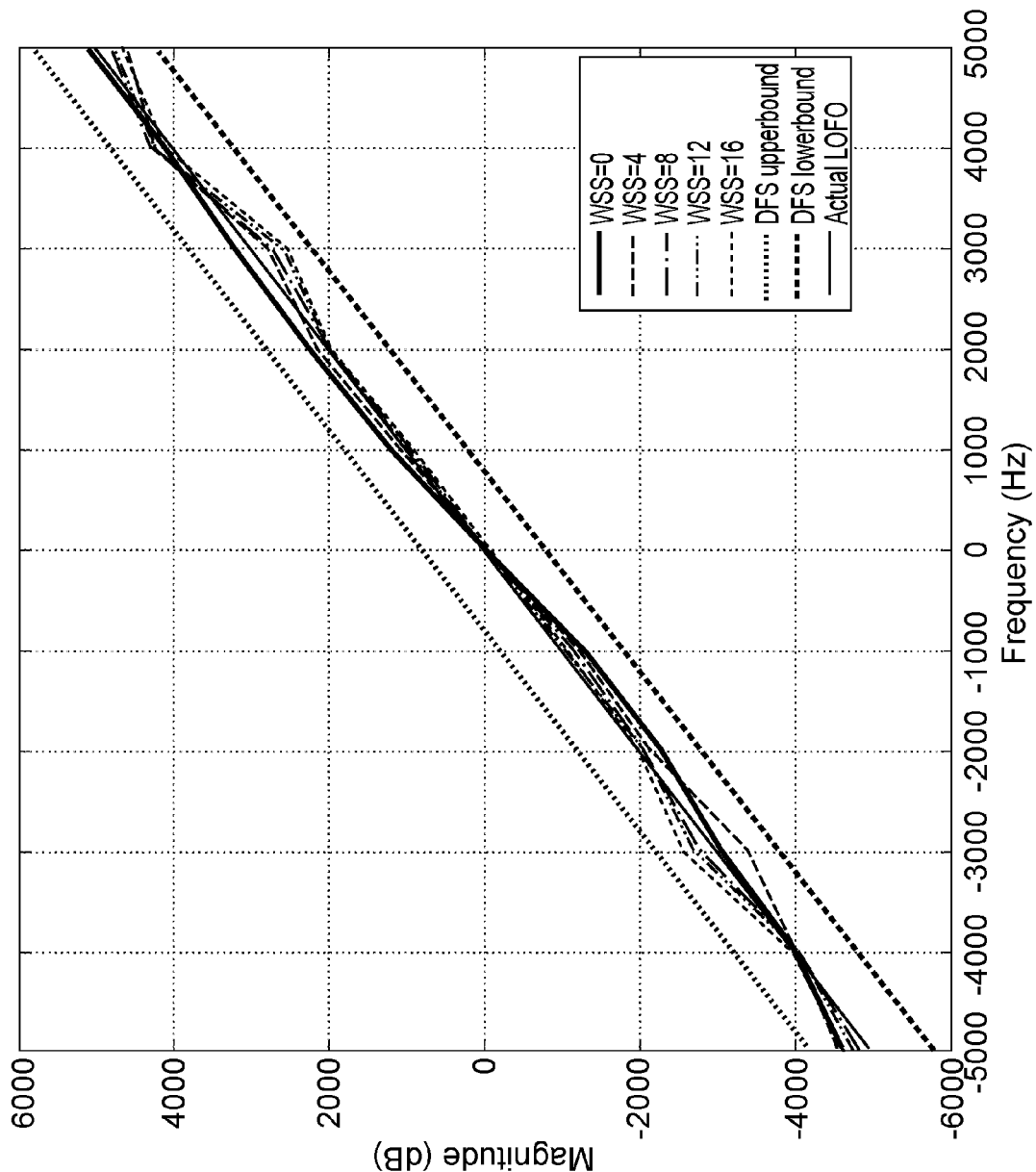
FIG. 10 depicts estimated LOFOs after refinement for the same numbers of channel filters as in FIG. 9.

FIG. 9 depicts estimated LOFOs for various numbers of channel filters 192. FIG. 10 depicts estimated LOFOs after refinement for the same numbers of channel filters 192 as in FIG. 9.

As shown in FIG. 9, the effect of channel filtering can have more impact on higher frequency areas. For example, the errors for the estimated LOFOs without refinement can be more than 800 MHz when the estimated LOFOs are more than 2 GHz or less than −2 GHz. In comparison, FIG. 10 shows that by estimating a refined LOFO when the estimated values are more than 2 GHz or less than −2 GHz, the errors for the refined LOFOs are significantly reduced. As well, the performance of the LOFOE after refinement is significantly less sensitive to the channel filtering effect.

Figure 11:
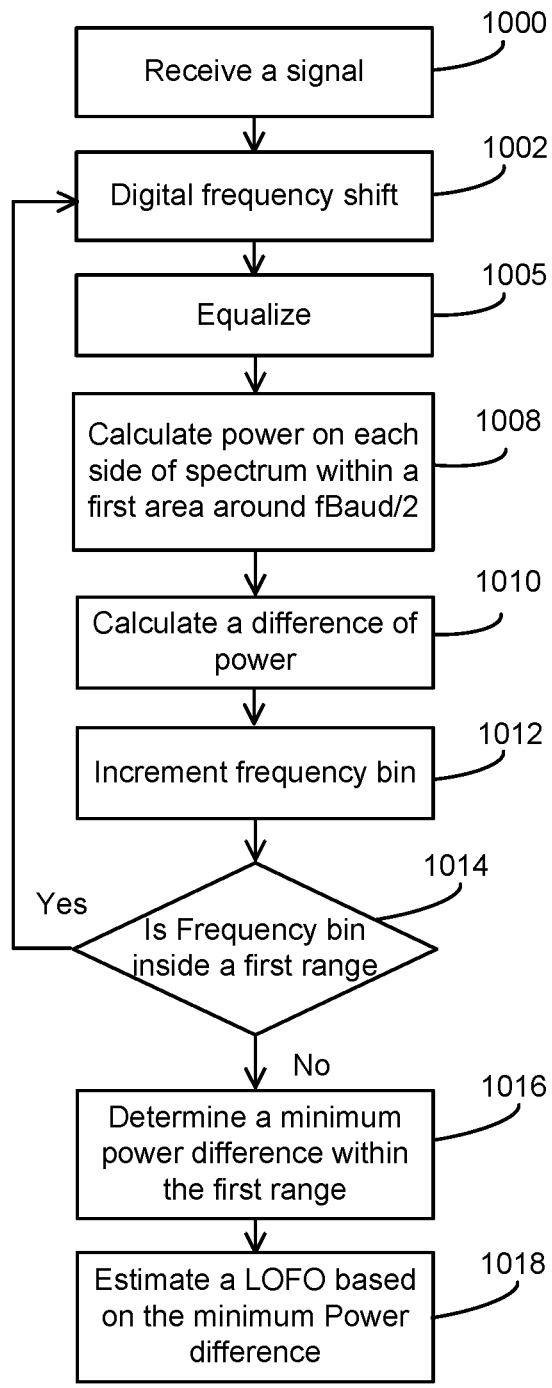
FIG. 11 is a flowchart of a method for estimating a LOFO in a coherent optical receiver, according to some embodiments.

FIG. 11 is a flowchart of a method for estimating a LOFO in a coherent optical receiver, according to some embodiments. A signal is received (1000) by the coherent optical receiver and a spectrum of the received signal is digitally shifted (1002) according to one of a plurality of frequency shifts within a first range, as described above. Each shifted signal is equalized (1005). In some embodiments, the equalization (1005) is based on a hybrid shifted filter response of the receiver driver 136. The hybrid response is based on a combination of a linear shifted filter response and a circular shifted filter response of the receiver driver 136. The power on each side of the spectrum of each equalized signal is calculated (1008) over a band of frequencies (i.e., the first area) and a difference of power is calculated (1010) for each equalized signal. The first area is centered around a frequency that corresponds to half of the baud rate (or fBaud/2) of the received signal, as described above. The frequency bin is incremented (1012) and the steps (1002), (1005), (1008), and (1010) are repeated if the incremented frequency shift is determined (1014) to be within the first range. Once the plurality of frequency bins within the first range is exhausted, a minimum power difference is determined (1016) and used to estimate (1018) a LOFO of the received optical signal.

Figure 12:
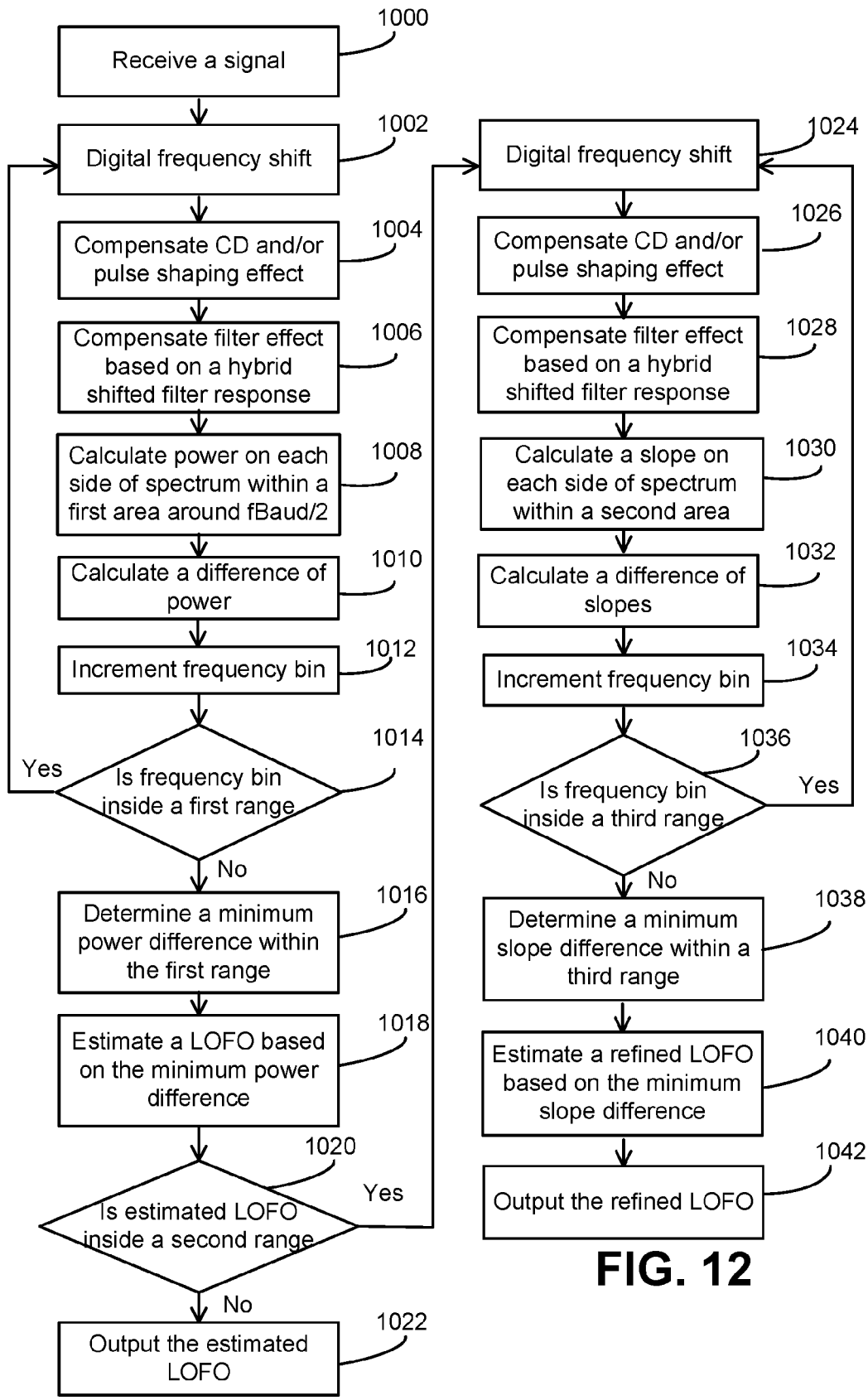
FIG. 12 is a flowchart of a refined method for estimating a LOFO in a coherent optical receiver, according to some embodiments.

FIG. 12 is a flowchart of a refined method for estimating a LOFO in a coherent optical receiver, according to some embodiments. A signal is received (1000) by the coherent optical receiver and a spectrum of the received signal is digitally shifted (1002) according to one of a plurality of frequency shifts within a first range, as described above. Each shifted signal can be equalized to compensate (1004) CD and/or pulse shaping effect and to compensate (1006) filter effect based on a hybrid shifted response of the receiver filter 136, as described above. The hybrid response is based on a combination of a linear shifted filter response and a circular shifted filter response of the receiver driver 136. The power on each side of the spectrum of each equalized signal is calculated (1008) and a difference of power is calculated (1010) for each equalized signal. The power on each side of the signal spectrum is calculated within a first area centered around a frequency that corresponds to half of the baud rate (or fBaud/2) of the signal, as described above. The frequency bin is incremented (1012) and the steps (1002), (1004), (1006), (1008), and (1010) are repeated if the incremented frequency shift is determined (1014) to be within the first range. Once the plurality of frequency bins within the first range is exhausted, a minimum power difference is determined (1016) and used to estimate (1018) a LOFO of the received optical signal.

The refined method further includes a determination (1020) of whether the estimated LOFO (1018) is within a second range. The second range is a subset of the first range and is generally where the spectrum of the equalized signal is affected by channel filtering.

If the estimated LOFO is outside the second range, the estimated LOFO is output (1022) for adjusting the LO laser 132.

If the estimated LOFO is within the second range, the received signal is again digitally shifted (1024) according to one of a plurality of frequency bins within a third range, as described above. Each shifted signal can be equalized to compensate (1026) CD and/or pulse shaping effect and to compensate (1028) filter effect based on a hybrid shifted response of the receiver driver 136, as described above. The slopes on two sides of the spectrum of each equalized signal is calculated (1030) and a difference of slopes is calculated (1032) for each equalized signal. The slope for each side of the spectrum is calculated within a second area located closer to the center of the spectrum than the first area. The second area can be obtained by moving the first area towards the center of the spectrum to be less affected from the channel filters 192. The frequency bin is incremented (1034) and the steps (1024), (1026), (1028), (1030), and (1032) are repeated if the incremented frequency shift is determined (1036) to be within a third range. The third range is determined based on the first range and the estimated LOFO. In one particular embodiment, the third range starts from the estimated LOFO and ends at an outer bound of the first range. Once the plurality of frequency bins within the third range is exhausted, a minimum slope difference is determined (1038) and used to estimate (1040) a refined LOFO of the received optical signal. The refined LOFO is output (1042) for adjusting the LO laser 132.

According the described embodiments, only the baud rate is required for the blind LOFO estimation and no training sequences or modulation formats are required. The various embodiments achieve a low complexity and are based on an energy measurement involving only specific frequency bins. The blind LOFO estimation according to the various embodiments is resilient to the receiver filter characteristics and/or the channel filtering effect.

It is to be understood that the singular forms "a", "an" and "the" include plural referents unless the context clearly dictates otherwise. Thus, for example, reference to "a device" includes reference to one or more of such devices, i.e., there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for estimating a local oscillator frequency offset (LOFO) of a coherent optical receiver, the method comprising:
    receiving a signal by the coherent optical receiver;
    digitally shifting a spectrum of the received signal according to one of a plurality of frequency shifts within a pre-determined first range for a possible LOFO;
    equalizing the spectrum shifted according to each of the plurality of frequency shifts based on a hybrid shifted filter response of a receiver driver, the hybrid shifted filter response is based on a combination of a linear shifted response and a circular shifted filter response of the receiver driver;
    calculating a difference of power between two sides of each equalized spectrum, the power for each side of the spectrum being calculated within a first area centered around a frequency corresponding to half of a baud rate of the received signal;
    determining a minimum power difference among the plurality of frequency shifts within the first range; and
    outputting the frequency shift having the minimum power difference as an estimated LOFO.

2. The method according to claim 1, further comprising compensating chromatic dispersion of each shifted signal before equalizing the shifted signal based on the hybrid shifted filter response of the receiver driver.

3. The method according to claim 1, further comprising:
    determining if the estimated LOFO is within a pre-determined second range likely to be affected by channel filtering, the pre-determined second range being a subset of the first range; and
    adjusting a local oscillator of the optical coherent receiver based on the estimated LOFO if the estimated LOFO is outside the second range.

4. The method according to claim 1, further comprising:
    determining if the estimated LOFO is within a pre-determined second range likely to be affected by channel filtering, the pre-determined second range being a subset of the first range; and
    if the estimated LOFO is within the second range:
        calculating a difference of slopes between two sides of the equalized spectrum, the slope for each side of the spectrum being calculated within a second area located closer to a center of the spectrum than the first area;
        determining a minimum slope difference among a plurality of frequency shifts within a third range, the third range being from the estimated LOFO to an outer bound of the first range; and
        outputting the frequency shift within the third range having the minimum slope difference as a refined LOFO.

5. The method according to claim 4, further comprising:
    if the estimated LOFO is within the second range:
        digitally shifting the received signal according to one of the plurality of frequency shifts within the third range; and
        equalizing each shifted signal based on the hybrid shifted filter response.

6. A digital signal processing apparatus implemented at least partially in hardware for estimating a local oscillator frequency offset (LOFO) of a coherent optical receiver, the digital signal processing apparatus comprising:
    a digital frequency shifter for digitally shifting a spectrum of a signal received by the coherent optical receiver according to one of a plurality of frequency shifts within a pre-determined first range for a possible LOFO;
    an equalizer module for equalizing the spectrum shifted according to each of the plurality of frequency shifts based on a hybrid shifted filter response of a receiver driver, the hybrid shifted filter response is based on a combination of a linear shifted response and a circular shifted filter response of the receiver driver; and a LOFO estimation module for estimating the LOFO, wherein the LOFO estimation module is configured to calculate a difference of power between two sides of each equalized spectrum, determine a minimum power difference among the plurality of frequency shifts within the first range, and output the frequency shift having the minimum power difference as an estimated LOFO, the power for each side of the spectrum being calculated within a first area centered around a frequency corresponding to half of a baud rate of the signal received by the coherent optical receiver.

7. The digital signal processing apparatus according to claim 6, wherein the equalizer module is further configured to compensate chromatic dispersion of each frequency shifted signal before equalizing the frequency shifted signal based on the hybrid shifted filter response of the receiver driver.

8. The digital signal processing apparatus according to claim 6, wherein the LOFO estimation module is further configured to:
  determine if the estimated LOFO is within a pre-determined second range likely to be affected by channel filtering, the pre-determined second range being a subset of the first range; and
  output the estimated LOFO if the estimated LOFO is outside the second range for adjusting a receiver local oscillator.

9. The digital signal processing apparatus according to claim 6, wherein the LOFO estimation module is further configured to:
  determine if the estimated LOFO is within a pre-determined second range likely to be affected by channel filtering, the pre-determined second range being a subset of the first range; and
  if the estimated LOFO is within the second range:
    calculate a difference of slopes between two sides of the equalized spectrum, the slope for each side of the spectrum being calculated within a second area located closer to a center of the spectrum than the first area;
    determine a minimum slope difference among the plurality of frequency shifts within a third range, the third range being from the estimated LOFO to an outer bound of the first range; and
    output the frequency shift within the third range having the minimum slope difference as a refined LOFO.

10. The digital signal processing apparatus according to claim 9, wherein the LOFO estimation module is further configured to:
  if the estimated LOFO is within the second range:
    digitally shift the spectrum of the received signal according to one of the plurality of frequency shifts within the third range; and
    equalize each frequency shifted signal based on the hybrid shifted filter response.

11. A method for estimating a local oscillator frequency offset (LOFO) of a coherent optical receiver, the method comprising:
  receiving a signal by the coherent optical receiver;
  digitally shifting a spectrum of the received signal according to one of a plurality of frequency shifts within a first pre-determined range for a possible LOFO;
  equalizing the spectrum shifted according to each of the plurality of frequency shifts based on a shifted filter response of a receiver driver;
  calculating a difference of power between two sides of each equalized spectrum, the power for each side of the spectrum being calculated within a first area centered around a frequency corresponding to half of a baud rate of the received signal;
  determining a minimum power difference among the plurality of frequency shifts within the first range;
  output the frequency shift in the first range having the minimum power difference as an estimated LOFO; and
  determining if the estimated LOFO is within a pre-determined second range likely to be affected by channel filtering, the pre-determined second range being a subset of the first range, wherein
  if the estimated LOFO is within the second range, the method further comprises:
    calculating a difference of slopes between two sides of the equalized spectrum, the slope for each side of the spectrum being calculated within a second area located closer to a center of the spectrum than the first area;
    determining a minimum slope difference among the plurality of frequency shifts within a third range, the third range being from the estimated LOFO to an outer bound of the first range; and
    outputting the frequency shift in the third range having the minimum slope difference as a refined LOFO.

12. The method according to claim 11, further comprising:
  adjusting a local oscillator of the coherent optical receiver based on the estimated LOFO if the estimated LOFO is outside the second range.

13. The method according to claim 11, wherein if the estimated LOFO is within the second range, the method further comprising:
  digitally shifting the spectrum of the received signal according to one of the plurality of frequency shifts within the third range;
  equalizing each shifted signal based on the shifted filter response.

14. The method according to claim 11, further comprising compensating chromatic dispersion of each shifted signal before equalizing the shifted signal based on the hybrid shifted filter response of the receiver driver.

* * * * *